United States Patent
Rywelski (10) Patent No.: US 12,524,493 B1
(45) Date of Patent: Jan. 13, 2026

(54) DATA AGGREGATION LAYERING

(71) Applicant: FanDuel Limited, Edinburgh (GB)

(72) Inventor: Konrad Rywelski, Kirkland, WA (US)

(73) Assignee: FanDuel Limited, Edinburgh (GB)

( * ) Notice: Subject to any disclaimer, the term of this patent is extended or adjusted under 35 U.S.C. 154(b) by 0 days.

(21) Appl. No.: 19/090,880

(22) Filed: Mar. 26, 2025

(51) Int. Cl.
 *G06F 16/957* (2019.01)
 *G06F 9/451* (2018.01)
 *G06F 16/215* (2019.01)

(52) U.S. Cl.
 CPC .......... *G06F 16/9574* (2019.01); *G06F 9/451* (2018.02); *G06F 16/215* (2019.01)

(58) Field of Classification Search
 CPC ..... G06F 16/9574; G06F 9/451; G06F 16/215
 USPC ........................................................ 715/234
 See application file for complete search history.

(56) References Cited

U.S. PATENT DOCUMENTS

| | | | | |
|---|---|---|---|---|
| 7,987,420 B1 * | 7/2011 | Kloba | ................. | G06F 16/9574 715/236 |
| 8,458,290 B2 * | 6/2013 | Black | ..................... | G06F 16/27 709/217 |
| 8,595,308 B1 * | 11/2013 | Kloba | ................... | H04L 67/568 709/227 |
| 9,094,258 B2 * | 7/2015 | Broda | ..................... | H04L 67/02 |
| 10,387,171 B2 * | 8/2019 | Hazarika | ................. | G06F 9/541 |
| 11,716,405 B1 * | 8/2023 | Hoffman | ............ | G06F 16/9574 709/218 |
| 2003/0126156 A1 * | 7/2003 | Stoltenberg | ........... | G06F 16/215 |
| 2011/0125770 A1 * | 5/2011 | Battestini | .............. | G06Q 10/00 707/758 |
| 2015/0205842 A1 * | 7/2015 | Jain | ........................ | G06Q 10/10 707/732 |
| 2015/0207888 A1 * | 7/2015 | Swanson | ................ | G06F 16/40 709/219 |
| 2019/0196674 A1 * | 6/2019 | Baig | ................... | G06F 16/9537 |
| 2023/0124081 A1 * | 4/2023 | Chandrasekaran | ......................... | G06F 9/44526 709/230 |

* cited by examiner

*Primary Examiner* — William D Titcomb
(74) *Attorney, Agent, or Firm* — Erise IP, P.A.

(57) ABSTRACT

Systems, methods, and computer-readable media for fetching data associated with one or more mappings for rendering with a user interface. A method may include receiving a request from the browser for the data at the content delivery network, querying the server-side cache of the content delivery network to determine if the one or more mappings within the data is within the server-side cache, receiving information indicative of a cache hit or a cache miss from the server-side cache, if the information is the cache miss, retrieving the one or more mappings from the data store, parsing the one or more mappings to obtain the data; and serving the data to the browser for rendering the user interface.

20 Claims, 6 Drawing Sheets

DATA AGGREGATION LAYERING

BACKGROUND

1. Field

Embodiments of the present disclosure relate to web applications. More specifically, embodiments of the present disclosure relate to the fetching and caching of aggregated data for web applications.

2. Related Art

Modern web applications often rely on robust datasets in order to provide user experiences. For example, a modern sports gaming platform may rely on player data, such as names, player numbers, and photos; team data, such as team names and team mascots; and game data, such as schedules, opponents, and records. As such, in order to provide a user experience including players, teams, and games, the platform may need to retrieve datasets from a variety of sources. Unfortunately, retrieving and providing data from different sources may prove challenging. For example, a developer desiring to use data from different data sources may need to normalize the data before utilizing the data to account for a multitude of structuring and formatting techniques used by the different data sources.

As such, developers wanting to combine datasets to provide a better user experience on the front end may require a working knowledge of data normalization and other techniques that would allow the developer to combine data sources in a cohesive manner. Additionally, developers wanting to combine datasets to provide a better user experience may need to dedicate a significant amount of time to this process. As such, a way to democratize data from various sources that allows developers to utilize multiple data sources and do so efficiently is desired. Additionally, alongside the desire to use data from various sources is the desire to serve data for rendering as efficiently as possible, due to the impact that web page rendering times have on a user's experience with a web application. One element that impacts web page rendering times is the speed at which the data being rendered is retrieved. Thus, systems and methods are desired for the efficient access of data.

SUMMARY

In some aspects, the techniques described herein relate to a system for fetching data associated with one or more mappings for rendering with a user interface, the system including: a content delivery network operable to retrieve the one or more mappings, the content delivery network including a server-side cache operable to store the one or more mappings; a browser for requesting the data and rendering the user interface; a data store operable to store the one or more mappings; and one or more non-transitory computer-readable media including computer-executable instructions that, when executed by at least one processor, perform a method for fetching the data associated with the one or more mappings for rendering with the user interface, the method including: receiving a request from the browser for the data at the content delivery network; querying the server-side cache of the content delivery network to determine if the one or more mappings within the data is within the server-side cache; receiving information indicative of a cache hit or a cache miss from the server-side cache; if the information is the cache miss, retrieving the one or more mappings from the data store; parsing the one or more mappings to obtain the data; and serving the data to the browser for rendering the user interface.

In some aspects, the techniques described herein relate to a system, wherein the method further includes: responsive to retrieving the one or more mappings from the data store, storing the one or more mappings within the server-side cache.

In some aspects, the techniques described herein relate to a system, further including: a mapping engine operable for generating the one or more mappings based on a plurality of datasets received from a plurality of data sources.

In some aspects, the techniques described herein relate to a system, wherein the method further includes: receiving, at the mapping engine, the plurality of datasets from the plurality of data sources; and generating, based on the plurality of datasets, the one or more mappings.

In some aspects, the techniques described herein relate to a system, wherein a first data source from the plurality of data sources is a third-party data source and a second data source from the plurality of data sources is an internal data source.

In some aspects, the techniques described herein relate to a system, wherein the mapping engine is further operable to remove redundancies between a first dataset from a first data source from the plurality of data sources and a second dataset from a second data source from the plurality of data sources.

In some aspects, the techniques described herein relate to a system, wherein the one or more mappings include at least one of a player mapping, a team mapping, or a market mapping.

In some aspects, the techniques described herein relate to a method for fetching data associated with one or more mappings for rendering with a user interface, the method including: receiving a request from a browser for the data at a content delivery network; querying a server-side cache of the content delivery network to determine if the one or more mappings within the data is within the server-side cache; receiving information indicative of a cache hit or a cache miss from the server-side cache; if the information is the cache miss, retrieving the one or more mappings from a data store; responsive to retrieving the one or more mappings from the data store, storing the one or more mappings within the server-side cache; parsing the one or more mappings to obtain the data; and serving the data to the browser for rendering the user interface.

In some aspects, the techniques described herein relate to a method, wherein retrieving the one or more mappings includes: forwarding a second request for the one or more mappings to an API, wherein the request is a first request; accessing the data store including the one or more mappings; and forwarding the one or more mappings to the API.

In some aspects, the techniques described herein relate to a method, further including: receiving a first dataset from a first data source; receiving a second dataset from a second data source; generating the one or more mappings based on the first dataset and the second dataset; and storing the one or more mappings in the data store.

In some aspects, the techniques described herein relate to a method, wherein generating the one or more mappings includes: comparing the first dataset to the second dataset to determine similarities; and eliminating redundancies between the first dataset and the second dataset.

In some aspects, the techniques described herein relate to a method, wherein generating the one or more mappings includes: determining a similarity score between a first data point from the first dataset and a second data point from a second dataset; and if the similarity score exceeds a predetermined threshold, including the first data point and the second data point in a mapping from the one or more mappings.

In some aspects, the techniques described herein relate to a method further including: marking one or more anomalous data points from the first dataset for manual review.

In some aspects, the techniques described herein relate to a method, wherein the method further includes: receiving a second request for second data associated with the one or more mappings, wherein the request is a first request and the data is a first data; retrieving the one or more mappings from the server-side cache; parsing the one or more mappings for the second data; and serving the second data to the browser for rendering a second user interface, wherein the user interface is a first user interface.

In some aspects, the techniques described herein relate to one or more non-transitory computer-readable media including computer-executable instructions that, when executed by at least one processor, perform a method for fetching data associated with one or more mappings for rendering with a user interface, the method including: receiving a request from a browser for the data at a content delivery network; querying a server-side cache of the content delivery network to determine if the one or more mappings within the data is within the server-side cache; receiving information indicative of a cache hit or a cache miss from the server-side cache; if the information is the cache miss, retrieving the one or more mappings from a data store; parsing the one or more mappings to obtain the data; and serving the data to the browser for rendering the user interface.

In some aspects, the techniques described herein relate to one or more non-transitory computer-readable media, wherein the method further includes: determining whether the data is cached by the browser in a browser cache; and if the data is cached by the browser, rendering the data from the browser cache.

In some aspects, the techniques described herein relate to one or more non-transitory computer-readable media, wherein the method further includes: responsive to serving the data to the browser for rendering the user interface, storing the data in the browser cache.

In some aspects, the techniques described herein relate to one or more non-transitory computer-readable media, wherein the method further includes: determining whether the data is cached by the browser in a browser cache; if the data is cached by the browser, determining whether the data is valid based on a predetermined timeout time; and if the data is valid, rendering the data from the browser cache.

In some aspects, the techniques described herein relate to one or more non-transitory computer-readable media, wherein the method further includes: receiving a first dataset from a first data source; receiving a second dataset from a second data source; generating the one or more mappings based on the first dataset and the second dataset; and storing the one or more mappings in the data store.

In some aspects, the techniques described herein relate to one or more non-transitory computer-readable media, wherein the first dataset includes a timeout time, wherein the one or more mappings are updated based on the timeout time.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the technology can include a variety of combinations and/or integrations of the embodiments described herein.

The following disclosure is directed to systems, methods, and computer-readable media for fetching data associated with one or more mappings for rendering with a user interface. A data fetching system may include a mapping engine. The mapping engine may generate one or more mappings based on a plurality of datasets. The plurality of datasets may be received from a plurality of data sources. The plurality of data sources may be internal sources or third-party sources. Each mapping from the one or more mappings may have one or more characteristics defining the relationships between the data points within the one or more mappings. As such, each mapping may be a grouping of related data such that the one or more mappings include one or more groups of related data. Consequently, the one or more mappings may contain more data than that requested by a browser in a given instance, meaning that the one or more mappings are reusable for subsequent data requests for different data than that requested in the given instance.

The data fetching system may include a content delivery network. The content delivery network may receive a request for data, where the data is included in the one or more mappings. The content delivery network may include a server-side cache. The content delivery network may determine if the data is stored in the server-side cache. If the one or more mappings associated with the data are in the server-side cache, the server-side cache may provide information indicative of a cache hit. If a cache hit occurs, the server-side cache may be accessed to retrieve the one or more mappings. If the one or more mappings associated with the data are not in the server-side cache, the server-side cache may provide information indicative of a cache miss. If a cache miss occurs, the content delivery network may forward a request for the one or more mappings associated with the data to an API. The API may forward the request to a fetching engine for retrieval from the data store storing the one or more mappings. The fetching engine may then forward the one or more mappings to the content delivery network through the API.

Upon receiving the one or more mappings, the content delivery network may cache the one or more mappings for retrieval when subsequent data requests are received. Caching one or more mappings in the server-side cache may lead to more efficient data fetching for subsequent data requests. Additionally, after parsing the data from the one or more mappings and serving the data to the browser, the browser may cache the data on the client side, resulting in more efficient rendering when the data is requested an additional time.

Figure 1:
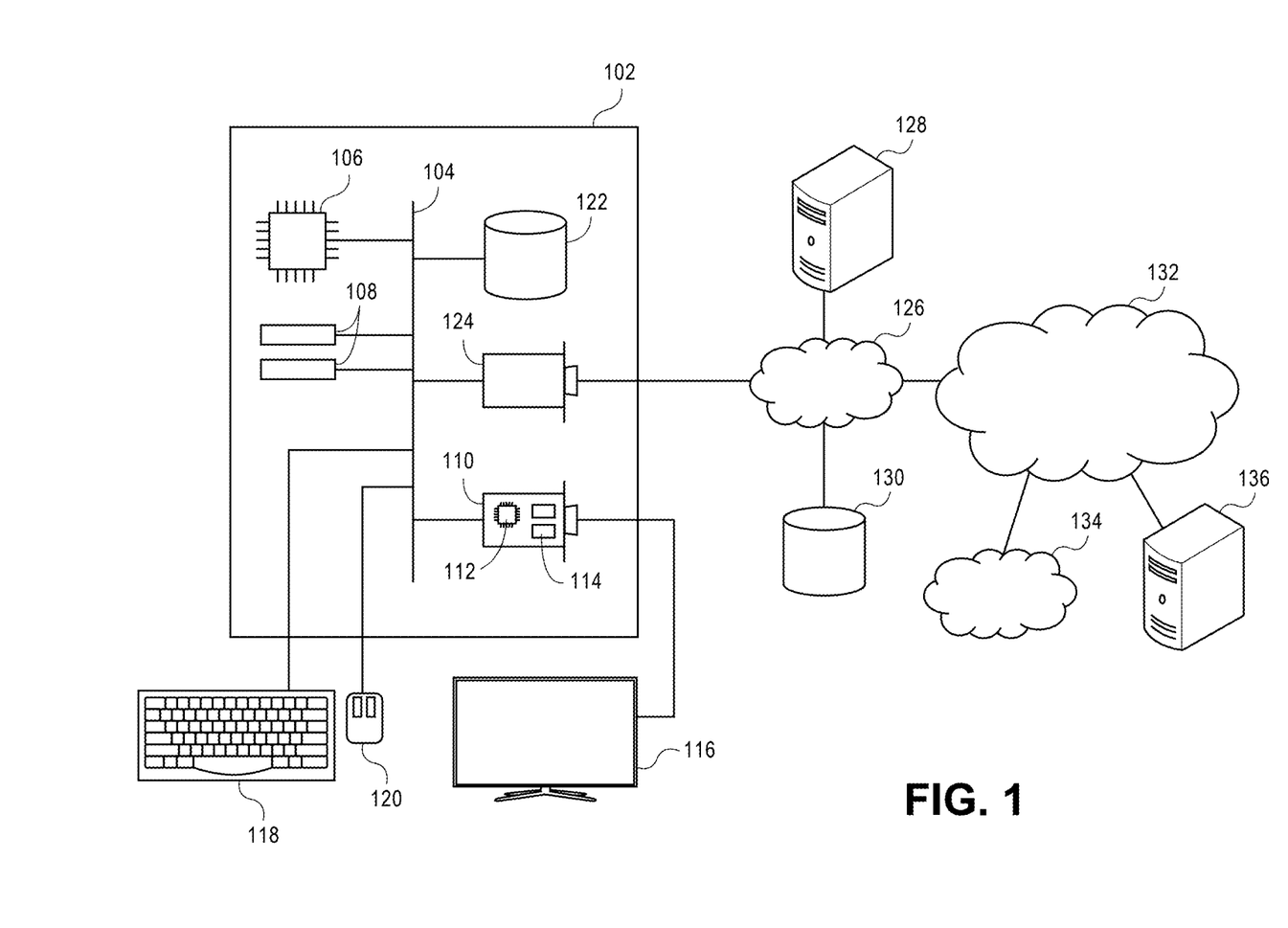
FIG. 1 depicts an exemplary hardware system in accordance with embodiments of the invention.

FIG. 1 illustrates an exemplary hardware platform relating to some embodiments of the present disclosure. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple buses, or components may communicate with each other directly. Connected to system bus 104 is CPU 106, also known as a central processing unit or a processor. Also attached to system bus 104 are one or more random-access memory (RAM) modules 108. Also attached to system bus 104 is graphics card 110. In some embodiments, graphics card 110 may not be a physically separate card but rather may be integrated into the motherboard or the CPU 106. In some embodiments, graphics card 110 has a separate graphics-processing unit (GPU) 112, which can be used for graphics processing or for general-purpose computing (GPGPU). Also on graphics card 110 is GPU memory 114. Connected (directly or indirectly) to graphics card 110 is display 116 for user interaction. In some embodiments, no display is present, while in others, it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-executable instructions, data structures, program modules, and other data representations.

Finally, NIC 124, also known as a network interface card is also attached to system bus 104 and allows computer 102 to communicate over a network such as local network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for datasets stored therein, such as backup or versioning. Data stores can be local to a single computer, such as computer 128, accessible on a local network, such as local network 126, or remotely accessible over Internet 132. Local network 126 is, in turn, connected to Internet 132, which connects many networks such as local network 126, remote network 134, or directly attached computers such as computer 136. In some embodiments, computer 102 can itself be directly connected to Internet 132.

Data Fetching Architecture

Figure 2:
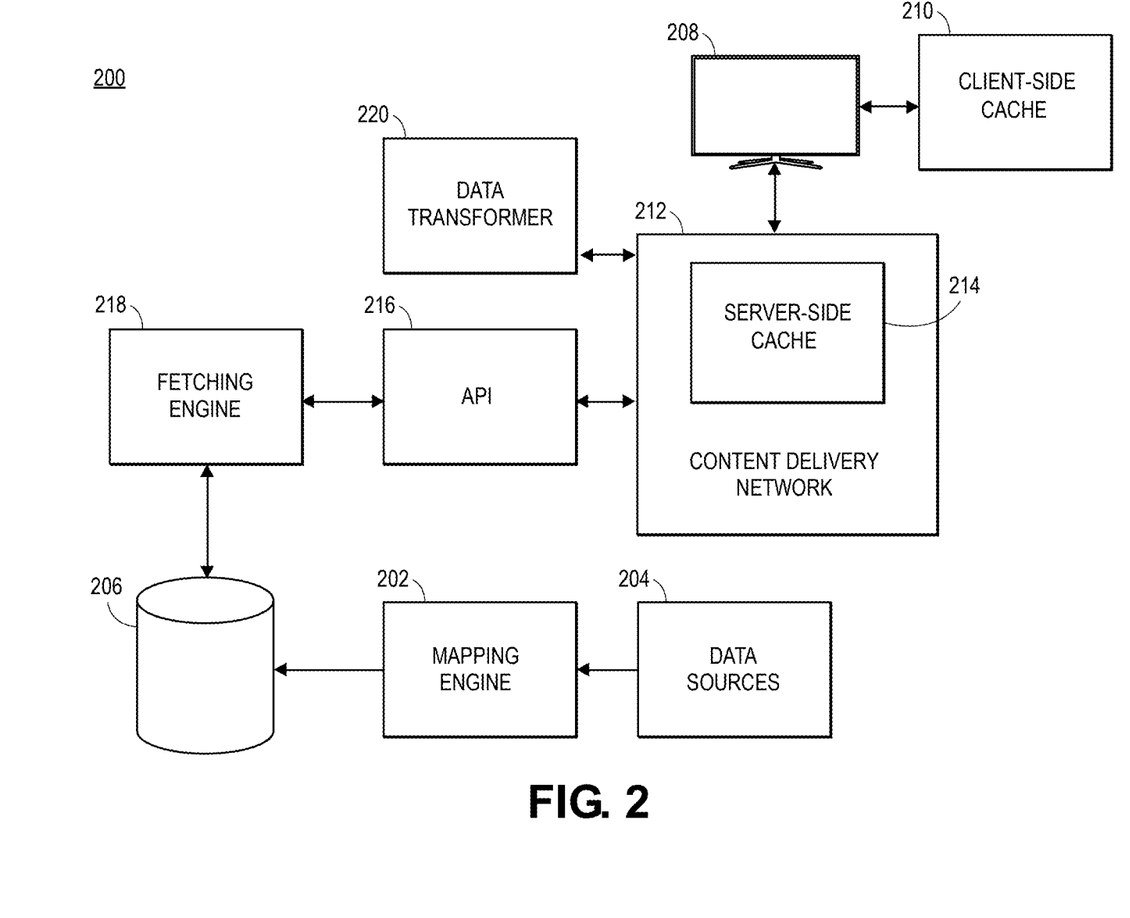
FIG. 2 depicts an exemplary system for data fetching in accordance with embodiments of the invention.

FIG. 2 depicts an exemplary system for data fetching in accordance with embodiments of the invention and is generally referred to herein as data fetching system 200. Generally, data fetching system 200 serves up data to a browser for rendering a user interface of a page of a web application. Data fetching system 200 first determines if a dataset is cached within a client-side cache. If the dataset is not cached within the client-side cache, data fetching system 200 requests the data from a content delivery network (CDN). Broadly, the data is included in one or more mappings, where the one or more mappings are sets of related data. The CDN determines if the requested data set is within the server-side cache. If the requested dataset is not within the server-side cache, the CDN requests the one or more mappings associated with the requested data through an API. Upon receiving the request, the API requests one or more mappings associated with the requested data set from the server-side cache without directly calling a fetching engine for the requested data set. As such, if the one or more mappings associated with the requested data set are within the server-side cache, the requested data may be parsed from the one or more mappings for service to the browser instead of fetching the requested data directly from fetching engine 218. If the one or more mappings are not within the server-side cache, then the one or more mappings may be stored within the server-side cache for efficient access when additional data set requests are transmitted to the CDN.

In some embodiments, data fetching system 200 aggregates and stores data from one or more data sources. Mapping engine 202 may retrieve and/or receive data from data sources 204, where data sources 204 includes a plurality of individual data sources from one or more providers. Data sources 204 may include one or more data types and data formats. For example, data sources 204 may provide information on game schedules, statistics, players, teams, and rankings. Accordingly, while statistical data may be represented as numerical values, player information may include string values. Thus, mapping engine 202 may receive a wide variety of data, the data not being in a singular, uniform format. Data sources 204 is described further below as it relates to data source 304a, data source 304b, and data source 304c.

In some embodiments, mapping engine 202 aggregates the data retrieved from data sources 204 into one or more mappings. For example, if a first data source includes a first set of data and a second data source includes a second set of data, mapping engine 202 combines the first set of data and the second set of data into one or more mappings. A mapping from the one or more mappings may be a set of related data. For example, a mapping may be a set of data of all NFL football teams. For another example, a mapping may be a set of all MLB players. For still another example, a mapping may be a set of all betting markets related to the current NFL season.

Broadly, mapping engine 202 determines similarities and relationships between data received from data sources 204. For example, mapping engine 202 may determine when a first set of data from a first data source is related to a second set of data from a second data source. Accordingly, mapping engine 202 may eliminate redundant data received from data sources 204. For example, if a first set of data from a first data source is identical to a second set of data from a second data source, mapping engine 202 may eliminate the first or second set of data from the mapping.

In some embodiments, mapping engine 202 normalizes data received from data sources 204. Put another way, if the data received from a first data source is in a first format and a second data source is in a second format, mapping engine 202 may convert the information from the first and/or second data source into a different format. For example, if a first data source includes probabilities represented as percentages while a second data source includes probabilities represented as decimal values, mapping engine 202 may convert the percentages of the first data source into decimal values. Similarly, a first data source might represent data in tabular format, while a second data source may represent data in JSON format. In such a scenario, mapping engine 202 might convert the first data source into JSON, convert the second data source into tabular format, or might convert both the first data source and the second data source into a third, distinct data format.

In some embodiments, mapping engine 202 automatically maps data from data sources 204. For example, mapping engine 202 may use one or more algorithms for determining redundancies, similarities, and differences as described herein. In other embodiments, mapping engine 202 is a manual or semi-manual mapping of data from data sources 204. For example, mapping engine 202 may use input from a system administrator to determine how one set of data relates to another set of data. For another example, mapping engine 202 may automatically map data from data sources 204, but mark data that contains anomalies, errors, misspellings, and other characteristics leading to uncertainty in a mapping. Accordingly, a system administrator may manually classify and map the anomalous data. Mapping engine 202 and data sources 204 are discussed more below as they relate to mapping engine 302 and data source 304a depicted in FIG. 3.

In some embodiments, mapping engine 202 stores the aggregated data in data store 206. Data store 206 may be any type of data store now known or later developed, including, but not limited to a local data store, a server, a cloud data store, an edge device, a distributed system, a hybrid storage solution, a personal computing device, an external drive, a network-attached storage (NAS), or a virtualized storage system. Data store 206 may be a singular data store or a plurality of data stores. Data store 206 may implement any type of structuring, including, but not limited to, flat file, hierarchical, network, relational, object-oriented, key-value, column-family, document-oriented, graph-based, and multi-model.

Generally, a web application may utilize data to provide a user interface through browser 208. In some embodiments, browser 208 may be embedded into a mobile application. For example, a sports-gaming web application running on browser 208 may display information about teams, sports, players, and betting markets for a user of the web application to interact with and make decisions from. As such, browser 208 may need to fetch the data utilized by a web application. As described more with regard to FIGS. 5A-5B, different pages and endpoints of a web application may utilize different information. For example, a first page may include a first betting market for a user to view and interact with, while a second page may include a second betting market for a user to view and interact with. As such, browser 208 may send out a request for data when each page is accessed.

In some embodiments, the data requested by browser 208 is contained within the one or more mappings stored within data store 206. For example, the data requested by browser 208 may be information on a specific player that is contained within the player mapping within data store 206. Accordingly, browser 208 may request the data from a content delivery network, referred to herein as CDN 212. Before requesting the data from CDN 212, however, browser 208 may determine if the data is already cached by browser 208 in client-side cache 210. If the data is located within client-side cache 210, browser 208 serves the data from client-side cache 210 and does not request data from CDN 212. This may increase time efficiency, as the time in which browser 208 takes to retrieve data from client-side cache 210 may be less than the time browser 208 would take to retrieve data from CDN 212.

Generally, the data located within client-side cache 210 may have an associated predetermined timeout threshold, where data stored for longer than the predetermined timeout threshold is no longer valid and cannot be served to browser 208. In some embodiments, the predetermined timeout threshold is selectively adjustable with regard to the one or more mappings stored in data store 206. For example, a player mapping may have a timeout threshold of two days, while a market mapping may have a timeout threshold of thirty minutes. Even further, the data within the one or more mappings may have selectively adjustable timeout thresholds. For example, real-time data stored within the player mapping may have a ten-second timeout threshold, whereas historic player statistic data within the player mapping may have a thirty-day timeout threshold.

In some embodiments, if browser 208 determines that the requested data is invalid within client-side cache 210 or not located within client-side cache 210, browser 208 may request the data from CDN 212. CDN 212 may facilitate the gathering of the requested data through API 216. Broadly, CDN 212 may utilize points of presence proximal to browser 208 to serve data to browser 208 quicker than if data was being gathered from farther distances. In some embodiments, CDN includes server-side cache 214, where server-side cache 214 stores mappings. For example, server-side cache 214 may store one or more previously fetched mappings from data store 206. By storing one or more previously fetched mappings in server-side cache 214, browser 208 may receive faster response times when requesting subsequent data associated with the one or more cached mappings than if the one or more mappings were retrieved from data store 206.

In some embodiments, the requested data may be a subset of the one or more mappings served within server-side cache 214. Accordingly, the one or more mappings may contain more data than that requested by browser 208 for a given request. For example, browser 208 may request information for a specific football team, whereas a mapping associated with that request may include information on all football teams. Thus, a mapping stored within server-side cache 214 may include the data requested by a plurality of browser requests. For example, if a first browser request requests a first data point associated with a mapping and a second browser requests a second data point associated with the same mapping, both the first data point and the second data point may be parsed from the same mapping cached within server-side cache 214. Storing a mapping within server-side cache 214 and thus storing more information than initially requested by browser 208 within server-side cache 214 proves advantageous, as subsequent requests may have cache hits at CDN 212, thus resulting in greater time efficiency than if data points had to be retrieved from data store 206.

Upon receiving a request for data from browser 208, CDN 212 may forward the request to API 216. In some embodiments, API 216 calls server-side cache 214 to determine whether the requested data is within server-side cache 214. If the requested data is within server-side cache 214 (e.g., a cache hit), the requested data may be served to browser 208. If the requested data is not within server-side cache 214 (e.g., a cache miss), CDN 212 may request the one or more mappings associated with the requested data through API 216. Upon receiving the request, API 216 requests the one or more mappings associated with the requested data set from CDN 212 without interfacing with fetching engine 218 for the requested data set. As such, if the one or more mappings associated with the requested data set are within server-side cache 214, the requested data may be parsed from the one or more mappings for service to browser 208 instead of fetching the requested data directly from fetching engine 218. If the one or more mappings are not within server-side cache 214, then the one or more mappings may then be subsequently stored within server-side cache 214 for access when additional data set requests are transmitted to CDN 212.

Accordingly, in some embodiments, CDN 212 may forward a request for one or more mappings to fetching engine 218 through API 216. Broadly, API 216 may be a communication gateway between CDN 212 and the location in which the one or more mappings are stored. API 216 may provide a single origin point for CDN 212 to fetch the one or more mappings. As such, CDN 212 does not need to determine where the one or more mappings are stored, instead relying on API 216 to fetch the mappings from the correct storage location. Accordingly, in response to receiving a request for the one or more mappings from CDN 212, API 216 may forward the request to fetching engine 218.

In some embodiments, in response to receiving the request from API 216, fetching engine 218 accesses data store 206 for the one or more mappings associated with the requested data. For example, if a player mapping and a team mapping are associated with the requested data, fetching engine 218 may access and retrieve the player mapping and the team mapping. Upon retrieving the one or more mappings, fetching engine 218 may transmit the one or more mappings to CDN 212 through API 216.

Before serving the requested data to browser 208, CDN 212 may interface with data transformer 220 to parse the requested data from the one or more mappings. For example, if the requested data is information on THE DENVER BRONCOS, data transformer 220 may parse the team mapping to retrieve all information on THE DENVER BRONCOS. Accordingly, only the requested data may be served to browser 208, rather than the mapping. This is advantageous, as the client side does not have to parse the one or more mappings for the data requested, resulting in a quicker user interface rendering time. Data transformer 220 may perform any number of additional tasks regarding the requested data, including formatting, structuring, localizing, cleansing, and normalizing.

In some embodiments, after receiving one or more mappings associated with the requested data, CDN 212 may cache the one or more mappings within server-side cache 214. Accordingly, when future requests are received from browser 208 for data, the one or more mappings may be retrieved from server-side cache 214, rather than fetching the one or more mappings from data store 206. This may increase data fetching efficiency, resulting in a better user experience within the web application interfaces rendered by browser 208.

Data Mapping Architecture

Figure 3:
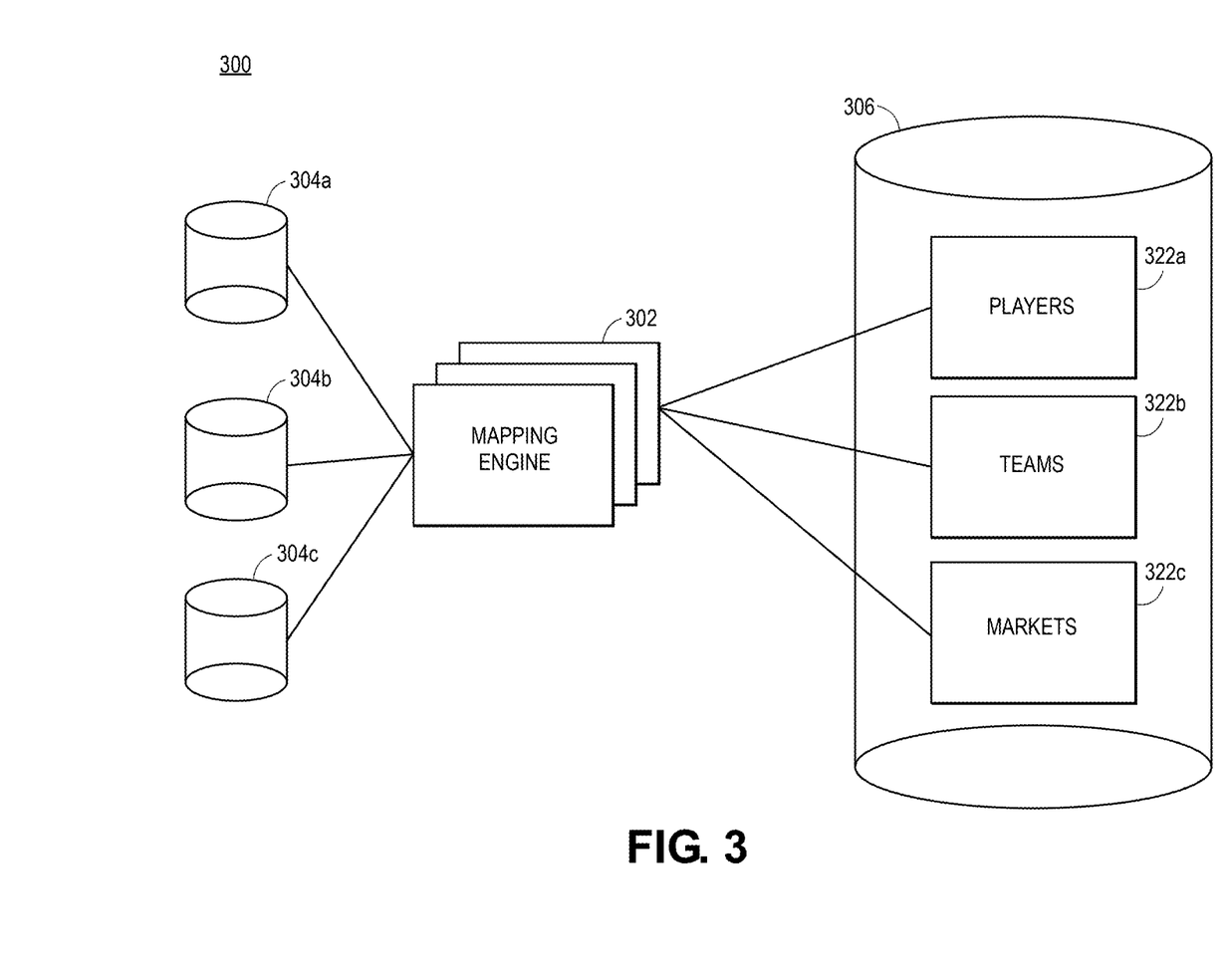
FIG. 3 depicts an exemplary system for data mapping in accordance with embodiments of the invention.

FIG. 3 depicts an exemplary system for data mapping in accordance with embodiments of the invention, generally referred to herein as mapping system 300. Generally, mapping system 300 aggregates data from a plurality of data sources into one or more mappings, where the data in each mapping has one or more relational characteristics. For example, mapping system 300 may aggregate NFL player data from a plurality of data sources to form a mapping, where all the data in the mapping relates to NFL players. Accordingly, a different mapping may be created for NFL teams or MLB players. Aggregating related data from a plurality of sources into one or more mappings may decrease data fetching times in network systems, as the system can make a singular request for a particular mapping rather than requesting different pieces of data from a plurality of separate data sources. Additionally, creating mappings of related data may give developers broader access to data when developing user experiences on the front end, because a developer may become aware of unknown data points related to known data through mappings.

Mapping engine 302, generally related to mapping engine 202 depicted in FIG. 2, receives data from data source 304*a*, data source 304*b*, and data source 304*c*, all generally related to data sources 204 depicted in FIG. 2. As described above with regard to data sources 204, data source 304*a*, data source 304*b*, and data source 304*c* may be any type of data source, including cloud data stores. In some embodiments, the data sources may be internal data sources, third-party data sources, or a combination of internal and third-party sources. For example, data source 304*a* may be an internal data source where the data within data source 304*a* is maintained and provided by the entity implementing mapping system 300. For another example, data source 304*b* may be a third-party provided data source, where the data provided by data source 304*b* is provided and maintained by a third-party provider, such as a broadcasting network or a bet market provider.

The data received from the data sources may be any type of data. Data may include numerical data, human-readable data such as text transcripts, image data, video data, audio data, and other types of data. For example, the data received may include image data of players. In some embodiments, the data received from the data sources relates to sports gaming. For example, the sports gaming data may include player information, team information, schedule information, season information, player statistics, team performance data, historical game outcomes, betting odds, injury reports, weather conditions, live game feeds, expert predictions, league schedules, betting market information, and real-time score updates.

In some embodiments, the data received from the data sources may be real-time data, where the data is received in real time by mapping engine 302. For example, the data may include real-time game updates, such as scores, time, broadcast streams, player information, and other game-related information. In some embodiments, the data received from the data sources is updated at predetermined intervals. For example, the data received from data source 304*a* may include NFL starting roster information, where the starting roster is updated weekly. For another example, the data received from data source 304*a* may be real-time data updated every 5 seconds. Accordingly, as discussed further below, mapping engine 302 may update one or more mappings when updated data is received. In some embodiments, the data received from the data sources is static data, such that it is not updated or updated on a case-by-case basis, such as when a team changes its logo.

Mapping engine 302 may structure data received into a predetermined format differing from the format in which it was received. The data received from the data sources may be structured in a certain format. For example, the data received from the data sources may be in a flat format, where data is stored as text strings in a table or CSV file. In some embodiments, the data received from the data sources may be unstructured, such as raw data from surveys, logs, records, footage, or manual data entries. Data sources may provide data in different formats relative to other data sources. For example, data source 304*a* may provide flatly structured numerical data relating to player statistics, while data source 304*b* provides raw, live video feed, and data source 304*c* provides flatly structured player information, including string values of player names and image data containing player headshots. In some embodiments, data sources provide data in the same format as other data sources. For example, data source 304*a* and data source 304*b* may both provide data in XML format, while data source 304*c* may provide data in a graph-based structure.

Broadly, mapping engine 302 aggregates the data from data sources, including data source 304*a*, data source 304*b*, and data source 304*c*. Mapping engine 302 generates one or more mappings for the aggregated data, where the data in each mapping is related to other data within the mapping. Mappings may group data based on any number of characteristics, including what sport the data relates to, whether the data relates to a team, whether the data relates to a player, whether the data relates to betting markets, and any other number of characteristics. Accordingly, mappings may vary in broadness. For example, a first mapping may be for all NFL players, while a second mapping may be for all NFL players on the KANSAS CITY CHIEFS. Mappings are discussed further below as they relate to player mapping 322*a*, team mapping 322*b*, and market mapping 322*c*.

Mapping engine 302 identifies relationships and or similarities between data received from a plurality of data sources. For example, if data source 304*a* includes player names and player teams, and if data source 304*b* includes player names and player statistics, mapping engine 302 may identify the relationships between the player names and player teams of data source 304*a* and the player names and player statistics of data source 304*b* to relate player names to both player teams and player statistics. As such, mapping engine 302 may create mappings with more robust information for a player, for example, then if a user was to only access one of data source 304*a* or data source 304*b*. In some embodiments, mapping engine 302 identifies redundancies and removes duplicate information. Continuing the example from above, if data source 304*c* includes the same player information as data source 304*b* and is being aggregated with data source 304*b*, only one data point for each duplicate data point between data source 304*a* and data source 304*b* may be included in the mapping.

In some embodiments, mapping engine 302 identifies anomalous data. Anomalous data may include erroneous data, false information, damaged data, and any other type of anomalous data. For example, mapping engine 302 may identify when a misspelling of a player name is present within the data from data source 304*a*. Accordingly, in some embodiments, mapping engine 302 may identify data corresponding to the correctly spelled player name and relate the misspelled player name data from data source 304*a* to said data. In other embodiments, mapping engine 302 may remove anomalous data. In still other embodiments, mapping engine 302 may flag anomalous data for user verification, as discussed further below.

In some embodiments, mapping engine 302 is executed automatically. Mapping engine 302 may be algorithm-based, where one or more algorithms are used to determine similarities and differences and relate data based on a number of characteristics. For example, mapping engine 302 may implement a similarity scoring algorithm, where different data points are assigned a similarity score. Mapping engine 302 may then map data together that exceeds a predetermined threshold for a similarity score. For another example, mapping engine 302 may be provided a list of characteristics to group data into mappings based on, where mapping engine 302 determines whether each data point meets the characteristics of the individual mappings.

In some embodiments, mapping engine 302 utilizes machine learning to aggregate data in the mappings. For example, mapping engine 302 may be trained on datasets of grouped and structured sports gaming data. Accordingly, mapping engine 302 may learn the relational characteristics within the datasets of grouped and structured sports gaming data to aggregate and group data received from the data sources. Mapping engine 302 may utilize any type of machine learning now known or later developed, including, but not limited to, k-means clustering, hierarchical clustering, density-based spatial clustering of applications with noise, Gaussian mixture models, mean shift clustering, spectral clustering, ordering points to identify the clustering structure, agglomerative clustering, and self-organizing maps.

In some embodiments, mapping engine 302 is implemented manually, such as by a user or system administrator. For example, each data point from data source 304a may be compared, by a user, to each data point from data source 304b to determine if the data points are related, different, anomalous, or duplicates. Accordingly, the user may create mappings of related data. In some embodiments, mapping engine 302 is semi-automatic. As described above, mapping engine 302 may group data together that exceeds a similarity threshold and flag anomalous data. In such embodiments, mapping engine 302 may flag anomalous data points for manual user review and mapping. For example, if mapping engine 302 flags the name "Ben Smiht" as potentially being anomalous, a user may manually map "Ben Smiht" to "Ben Smith."

In some embodiments, mapping engine 302 is implemented as a single engine, where data source 304a, data source 304b, and data source 304c are evaluated and mapped by a singular engine. In other embodiments, mapping engine 302 is implemented as a plurality of engines, where each mapping engine ingests and maps one or more data sources. For example, mapping engine 302 may include a mapping engine for data source 304a, a mapping engine for data source 304b, and a mapping engine for data source 304c. Accordingly, each mapping engine may be tailored for mapping a specific data source which may increase efficiency in the mapping process. Additionally, by implementing mapping engine 302 as a plurality of processes, the processes may be run in parallel, leading to greater time efficiency as compared to a singular process.

As described above, mapping engine 302 may create one or more mappings of the data received from a plurality of data sources. A mapping may be a set of related data, where the data is related based on one or more characteristics. For example, data may be mapped together based on the subject matter of the data, such as if the data relates to a particular sport, team, person, and the like. In some embodiments, data may be mapped together based on the type of data, such as if the data is statistical data or information represented by text characters. Mapping engine 302 may create any number of mappings. For example, mapping engine 302 may aggregate data and produce player mapping 322a, team mapping 322b, and market mapping 322c. Player mapping 322a may be all data relating to players for a particular sport, such as all NFL players. Team mapping 322b may be all data relating to teams for a particular sport, such as all NFL teams. Market mapping 322c may be all markets associated with a particular sport, such as active betting markets for the NFL and information associated with the betting markets.

In some embodiments, the characteristics of a mapping are defined by a user. For example, if the user wants to aggregate all data relating to MLB teams, the user may instruct mapping engine 302 to create a mapping of all MLB team data. In some embodiments, the mapping categories are determined by mapping engine 302. For example, if mapping engine 302 identifies a similarity between a plurality of data points, mapping engine 302 may automatically create a mapping based on that similarity. For example, if mapping engine 302 identifies 16 NHL players classified as "season superstars," mapping engine 302 may automatically create an NHL season superstar player mapping. The one or more mappings may then be stored in data store 306, generally relating to data store 206 described above. Accordingly, a fetching engine (such as fetching engine 218) may access the one or more mappings for serving a dataset associated with the one or more mappings to a browser.

Data Fetching Flow

Figure 4:
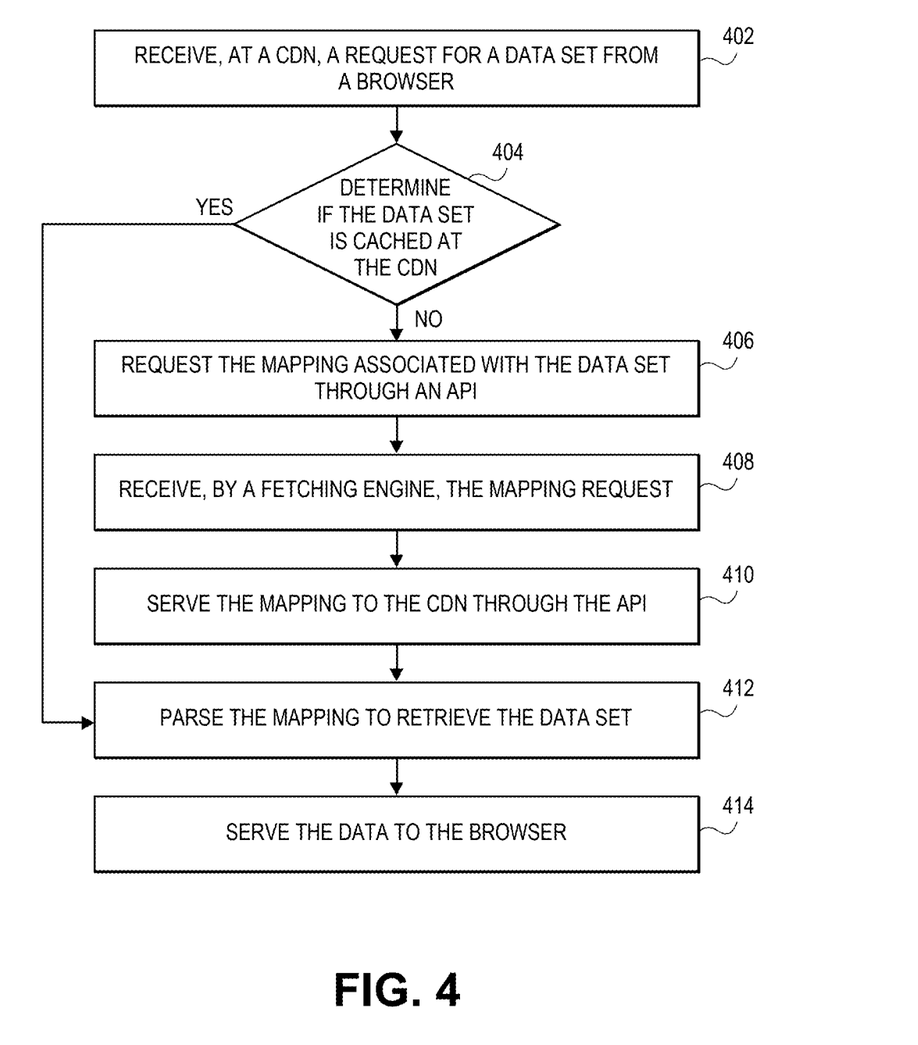
FIG. 4 depicts an exemplary flowchart for illustrating the operation of a method in accordance with embodiments of the invention.

FIG. 4 depicts an exemplary system for data fetching in accordance with embodiments of the invention, generally referred to as method 400. Method 400 is a method for retrieving a dataset from a server for rendering a page of a web application. Method 400 may be executed by all or some of data fetching system 200, or an entirely different data fetching system than that of data fetching system 200. Broadly, method 400 includes determining if a mapping associated with the dataset is within a CDN cache and retrieving the mapping from a data store if the mapping is not within the CDN cache. Given that the dataset is a subset of the mapping, the mapping may also be used for additional dataset requests, resulting in fewer calls to the data store (and quicker interface rendering) if the mapping is cached at the CDN.

In step 402, a request for a dataset is received by a content delivery network. Broadly, the content delivery network, such as CDN 212, facilitates the gathering of the dataset by parsing one or more mappings associated with the dataset, such as a team mapping, a player mapping, or a market mapping. For example, the CDN may determine if the mapping is housed locally, such as within a cache, or if the mapping is to be requested from a remote data store. Thus, in step 404, the content delivery network determines if the mapping associated with the dataset is cached. As described above, the CDN may include a cache, such as server-side cache 214, where the cache is more efficiently accessible for serving data to a browser than if the data is accessed from a remote data store. The CDN may store the one or more mappings within the cache when a dataset is parsed from the one of our mappings, thus making the one or more mappings available within the cache for subsequent data requests.

If the mapping associated with the dataset is cached, the method proceeds to step 412, as described below. If the mapping associated with the dataset is not cached, the method proceeds to step 406. In step 406, the content delivery network requests the mapping associated with the dataset through an API. As described above, the API, such as API 216, may be a single point of origin for the CDN to request one or more mappings. As such, the API may forward the request for one or more mappings to a fetching engine. In step 408, a fetching engine receives the request from the API for the mapping and fetches the mapping from a data store. For example, the fetching engine, such as fetching engine 218, may receive a request for the player mapping, at which point the fetching engine accesses a data store, such as data store 206, for retrieving the player mapping.

In step 410, the fetching engine serves the mapping to the content delivery network through the API. As described above, the CDN may cache the mapping within a server-side cache upon receiving the mapping from the API. Additionally, the CDN may interface with a data transformer to parse and/or perform additional processing before serving the dataset to the browser. In step 412, the mapping is parsed to retrieve the dataset requested by the browser. For example, the data transformer, such as data transformer 220, may parse the player mapping to obtain the information of three players included in the requested dataset. Additionally, the data transformer may perform a number of additional processes, including normalizing the data, structuring the data to fit the format of the interface, and other processes. Finally, in step 414, the dataset is provided to the browser. The browser may render the user interface associated with the dataset, where the dataset is integrated within the user interface. As such, a viewer of the user interface may be presented with the requested dataset.

Demonstrative User Interfaces

Figure 5A:
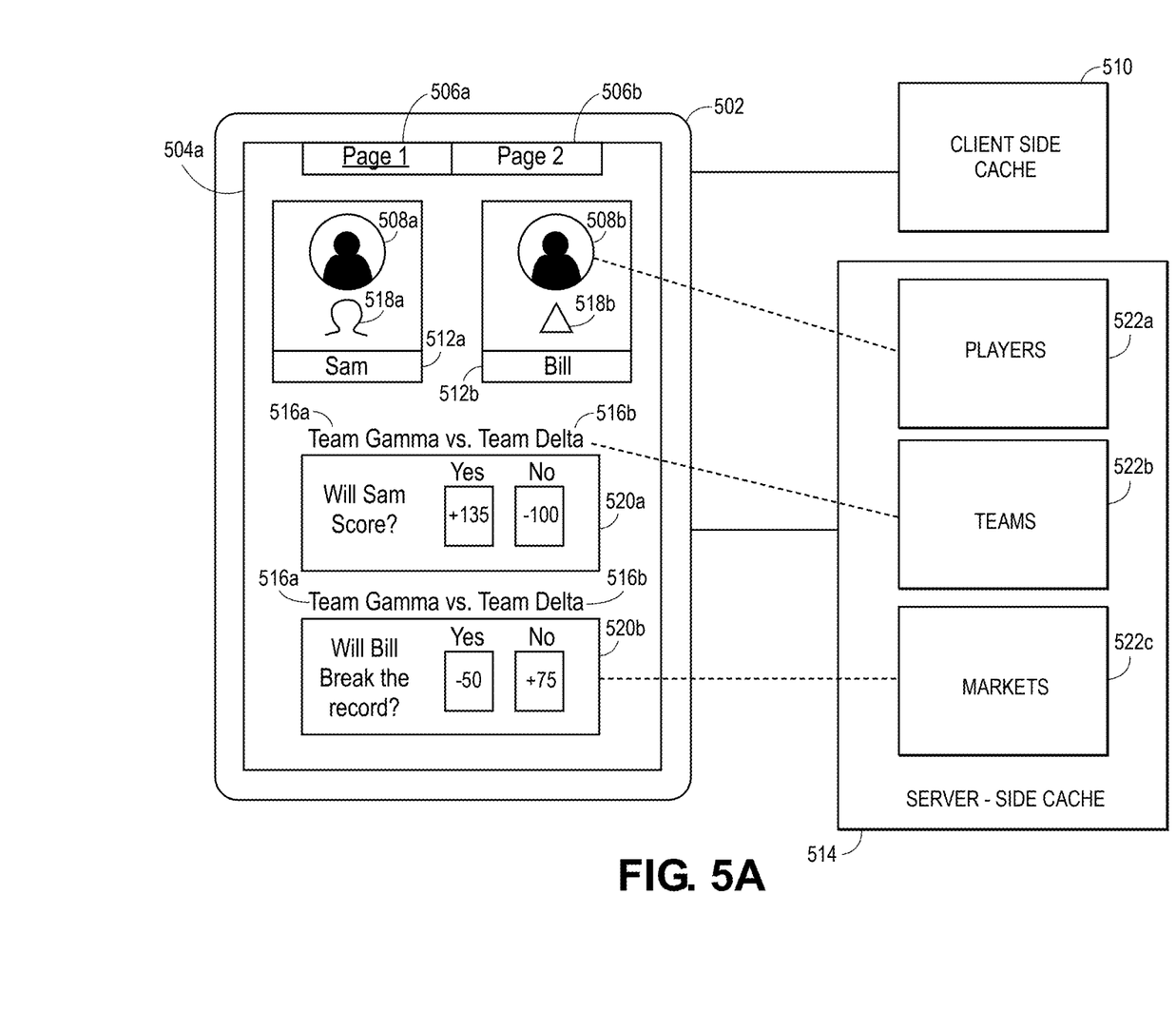
FIGS. 5A-5B depict exemplary web application interfaces in accordance with embodiments of the invention.
Figure 5B:
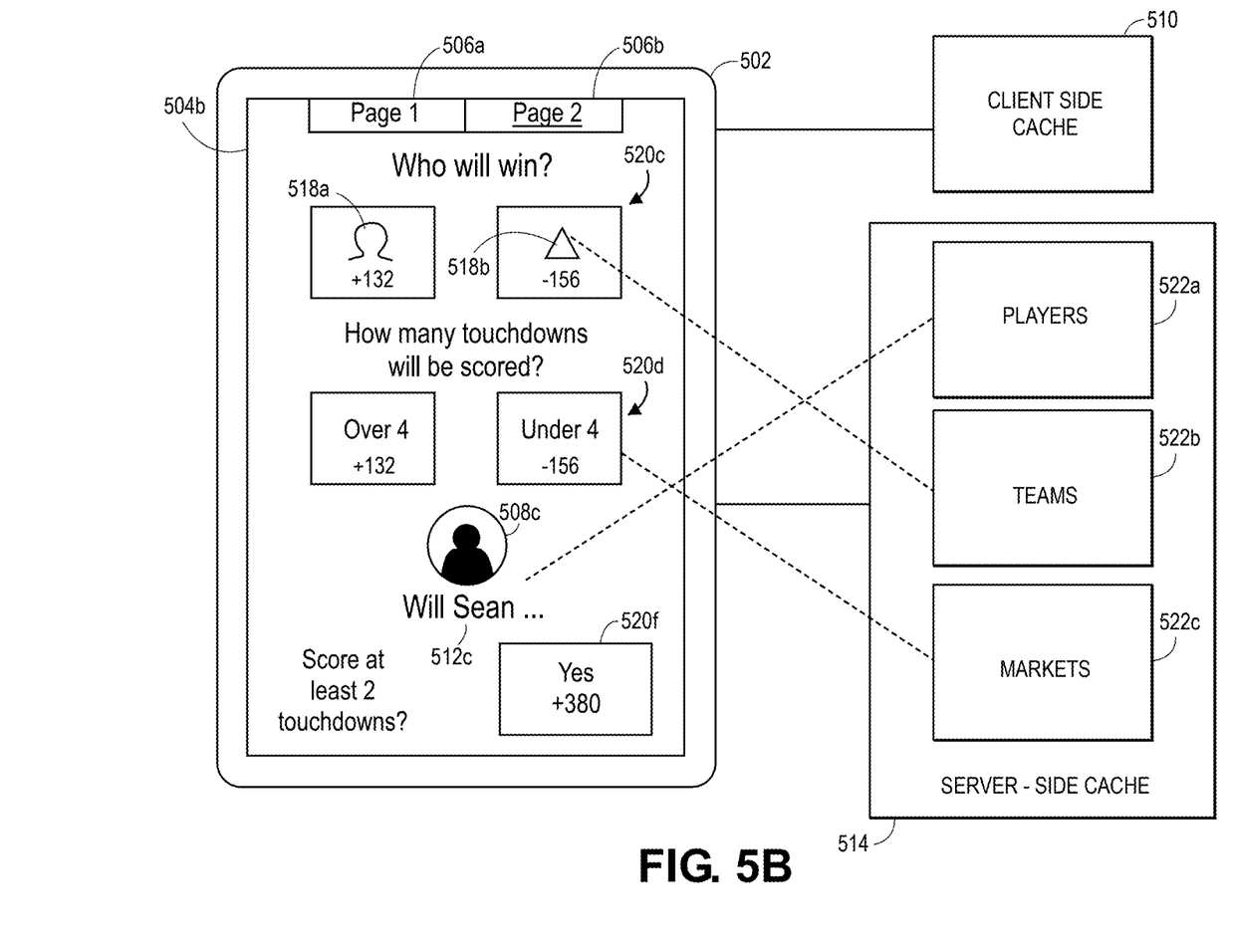

FIGS. 5A-5B depict exemplary web application interfaces in accordance with embodiments of the invention. Generally, interface 504a and interface 504b may be rendered by a browser running on client device 502. Client device 502 may be any computing device now known or later developed, including, but not limited to, a cellular device, a personal computing device, a desktop computer, a tablet, and any similar device. Interface 504a and interface 504b may be pages associated with endpoints of a web application. Interface 504a and interface 504b may include different data and endpoints. Thus, the browser (such as browser 208 depicted in FIG. 2) may need to request different datasets for rendering interface 504a and interface 504b.

In some embodiments, interface 504a may be page 506a, which is "Page 1." Page 506a may include various data points, including, but not limited to, player icon 508a, player icon 508b, player name 512a, player name 512b, team name 516a, team name 516b, team icon 518a, team icon 518b, market 520a, and market 520b. Thus, in order to render interface 504a, the browser may first determine whether the data for rendering, such as player icon 508a and player icon 508b, is within client-side cache 510, generally related to client-side cache 210 depicted in FIG. 2. If the data is within client-side cache 510, the browser may render the data by retrieving the data from client-side cache 510. This may allow for a quicker rendering than if the browser requests the data from the server side.

If the requested data is not within client-side cache 510, the browser may send a request for the data to a CDN. In such embodiments, the CDN (such as CDN 212 depicted in FIG. 2) may determine if one or more mappings associated with the requested data are within server-side cache 514, generally related to server-side cache 214 depicted in FIG. 2. As mentioned above, the requested data may be a subset of one or more mappings. Thus, if one or more mappings associated with the requested data are within server-side cache 514, the requested data may be parsed from the one or more mappings and served back to the browser for rendering interface 504a. For example, if player icon 508b is associated with player mapping 522a, generally related to player mapping 322a depicted in FIG. 3, player mapping 522a may be parsed to retrieve player icon 508b. Similarly, player mapping 522a may be parsed to retrieve player icon 508a, player name 512a, and player name 512b. For another example, if team name 516b is associated with team mapping 522b, generally related to team mapping 322b depicted in FIG. 3, team mapping 522b may be parsed to retrieve team name 516b. For still another example, if market 520b is associated with market mapping 522c, generally related to market mapping 322c depicted in FIG. 3, market mapping 522c may be parsed to retrieve market 520b.

Generally, as mentioned above, different pages of a web application may render different information but utilize the same mappings for retrieving the information. This is advantageous when one or more mappings are cached in server-side cache 514, as the one or more mappings retrieved for a previous data request may be used for subsequent data requests. For example, interface 504 may be page 506b of a web application, which is labeled "Page 2." Page 506b may include a different set of data than page 506b. For example, page 506b may include team icon 518a, market 520c, market 520d, player icon 508c, player name 512c, and market 520f. As such, if the data of page 506b is not stored within client-side cache 510, player mapping 522a, team mapping 522b, and market mapping 522c within server-side cache 514 may be accessed for retrieval of said data.

In some embodiments, a single mapping may contain data used by both of page 506b and page 506a. For example, team icon 518b may be parsed from team mapping 522b, market 520d may be parsed from market mapping 522c, and player icon 508c may be parsed from player mapping 522a. Thus, despite page 506a requesting the player name "Sam" and page 506b requesting the player name "Sean," the same instance of player mapping 522a may be accessed at server-side cache 514 for the player names, resulting in fewer calls to a data store (such as data store 206 depicted in FIG. 2) and greater rendering speeds.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A system for fetching data associated with one or more mappings for rendering a plurality of user interfaces, the system comprising:
   a content delivery network operable to retrieve the one or more mappings, the content delivery network including a server-side cache operable to store the one or more mappings;
   a browser for requesting the data and rendering a first user interface and a second user interface of the plurality of user interfaces;
   a data store operable to store the one or more mappings; and
   one or more non-transitory computer-readable media comprising computer-executable instructions that, when executed by at least one processor, perform a method for fetching first data and second data associated with the one or more mappings for rendering the plurality of user interfaces, the method comprising:
   receiving a first request from the browser for the first data at the content delivery network;
   querying the server-side cache of the content delivery network to determine if the one or more mappings including the first data are within the server-side cache;
   receiving information indicative of a cache hit or a cache miss from the server-side cache;
   if the information is the cache miss, retrieving the one or more mappings from the data store;
   parsing the one or more mappings to obtain the first data;
   serving the first data to the browser for rendering the first user interface;
   receiving a second request from the browser for the second data at the content delivery network;
   retrieving the one or more mappings from the server-side cache;
   parsing the one or more mappings to obtain the second data; and
   serving the second data to the browser for rendering the second user interface.

2. The system of claim 1,
wherein the method further comprises:
  responsive to retrieving the one or more mappings from the data store, storing the one or more mappings within the server-side cache.

3. The system of claim 1, further comprising:
a mapping engine operable for generating the one or more mappings based on a plurality of datasets received from a plurality of data sources.

4. The system of claim 3,
wherein the method further comprises:
  receiving, at the mapping engine, the plurality of datasets from the plurality of data sources; and
  generating, based on the plurality of datasets, the one or more mappings.

5. The system of claim 3,
wherein a first data source from the plurality of data sources is a third-party data source and a second data source from the plurality of data sources is an internal data source.

6. The system of claim 3,
wherein the mapping engine is further operable to remove redundancies between a first dataset from a first data source from the plurality of data sources and a second dataset from a second data source from the plurality of data sources.

7. The system of claim 1,
wherein the one or more mappings include at least one of a player mapping, a team mapping, or a market mapping.

8. A method for fetching first data and second data associated with one or more mappings for rendering with a plurality of user interfaces, the method comprising:
  receiving a first request from a browser for the first data at a content delivery network;
  querying a server-side cache of the content delivery network to determine if the one or more mappings including the first data are within the server-side cache;
  receiving information indicative of a cache hit or a cache miss from the server-side cache;
  if the information is the cache miss, retrieving the one or more mappings from a data store;
  responsive to retrieving the one or more mappings from the data store, storing the one or more mappings within the server-side cache;
  parsing the one or more mappings to obtain the first data;
  serving the first data to the browser for rendering a first user interface of the plurality of user interfaces;
  receiving a second request from the browser for the second data at the content delivery network;
  retrieving the one or more mappings from the server-side cache;
  parsing the one or more mappings to obtain the second data; and
  serving the second data to the browser for rendering a second user interface of the plurality of user interfaces.

9. The method of claim 8,
wherein retrieving the one or more mappings comprises:
  forwarding a third request for the one or more mappings to an API;
  accessing the data store including the one or more mappings; and
  forwarding the one or more mappings to the API.

10. The method of claim 8, further comprising:
  receiving a first dataset from a first data source;
  receiving a second dataset from a second data source;
  generating the one or more mappings based on the first dataset and the second dataset; and
  storing the one or more mappings in the data store.

11. The method of claim 8,
wherein a mapping of the one or more mappings includes a timeout time;
wherein the method further comprises:
  responsive to the timeout time occurring, regenerating the mapping of the one or more mappings.

12. The method of claim 10,
wherein generating the one or more mappings comprises:
  comparing the first dataset to the second dataset to determine similarities; and
  eliminating redundancies between the first dataset and the second dataset.

13. The method of claim 10,
wherein generating the one or more mappings comprises:
  determining a similarity score between a first data point from the first dataset and a second data point from a second dataset; and
  if the similarity score exceeds a predetermined threshold, including the first data point and the second data point in a mapping from the one or more mappings.

14. The method of claim 10 further comprising:
  marking one or more anomalous data points from the first dataset for manual review.

15. One or more non-transitory computer-readable media comprising computer-executable instructions that, when executed by at least one processor, perform a method for fetching first data and second data associated with one or more mappings for rendering with a plurality of user interfaces, the method comprising:
  receiving a first request from a browser for the first data at a content delivery network;
  querying a server-side cache of the content delivery network to determine if the one or more mappings including the first data are within the server-side cache;
  receiving information indicative of a cache hit or a cache miss from the server-side cache;
  if the information is the cache miss, retrieving the one or more mappings from a data store;
  parsing the one or more mappings to obtain the first data;
  serving the first data to the browser for rendering a first user interface of the plurality of user interfaces;
  receiving a second request from the browser for the second data at the content delivery network;
  retrieving the one or more mappings from the server-side cache;
  parsing the one or more mappings to obtain the second data; and
  serving the second data to the browser for rendering a second user interface of the plurality of user interfaces.

16. The one or more non-transitory computer-readable media of claim 15, wherein the method further comprises:
  determining whether the first data is cached by the browser in a browser cache; and
  if the first data is cached by the browser, rendering the first data from the browser cache.

17. The one or more non-transitory computer-readable media of claim 16, wherein the method further comprises:
  responsive to serving the first data to the browser for rendering the first user interface, storing the first data in the browser cache.

18. The one or more non-transitory computer-readable media of claim 15, wherein the method further comprises:
- determining whether the first data is cached by the browser in a browser cache;
- if the first data is cached by the browser, determining whether the first data is valid based on a predetermined timeout time; and
- if the first data is valid, rendering the first data from the browser cache.

19. The one or more non-transitory computer-readable media of claim 15, wherein the method further comprises:
- receiving a first dataset from a first data source;
- receiving a second dataset from a second data source;
- generating the one or more mappings based on the first dataset and the second dataset; and
- storing the one or more mappings in the data store.

20. The one or more non-transitory computer-readable media of claim 19,
- wherein the first dataset includes a timeout time, wherein the one or more mappings are updated based on the timeout time.

* * * * *